(12) United States Patent
Qureshi et al.

(10) Patent No.: US 10,290,447 B2
(45) Date of Patent: May 14, 2019

(54) WALL-MOUNTED SMART SWITCHES AND OUTLETS FOR USE IN BUILDING WIRING FOR LOAD CONTROL, HOME AUTOMATION, AND/OR SECURITY PURPOSES

(71) Applicant: Umbrela Smart Inc., Winnipeg (CA)

(72) Inventors: Salman Qureshi, Winnipeg (CA); Filipe Fernandes, Winnipeg (CA); Ryan Ramchandar, Winnipeg (CA)

(73) Assignee: Umbrela Smart Inc., Winnipeg (CA)

( * ) Notice: Subject to any disclaimer, the term of this patent is extended or adjusted under 35 U.S.C. 154(b) by 589 days.

(21) Appl. No.: 14/884,227

(22) Filed: Oct. 15, 2015

(65) Prior Publication Data
US 2016/0110154 A1 Apr. 21, 2016

Related U.S. Application Data

(60) Provisional application No. 62/064,168, filed on Oct. 15, 2014.

(51) Int. Cl.
*G06F 17/00* (2019.01)
*H01H 47/00* (2006.01)
(Continued)

(52) U.S. Cl.
CPC ......... *H01H 47/00* (2013.01); *G08B 13/1672* (2013.01); *G08B 13/19639* (2013.01);
(Continued)

(58) Field of Classification Search
CPC ...... H04R 3/12; H04B 3/00; H04B 2203/545; H04B 3/54; H04B 3/542; G06F 3/165;
(Continued)

(56) References Cited

U.S. PATENT DOCUMENTS 5,886,631 A 3/1999 Ralph
6,356,038 B2 3/2002 Bishel
(Continued)

FOREIGN PATENT DOCUMENTS

WO 2011023944 3/2011

OTHER PUBLICATIONS

Cortese et al, Experimental Security Surveillance System for an Islan-Based Facility 2016.
(Continued)

*Primary Examiner* — Fan S Tsang
*Assistant Examiner* — David Siegel
(74) *Attorney, Agent, or Firm* — Kyle R Satterthwaite; Ryan W Dupuis; Ade & Company Inc.

(57) ABSTRACT

A plurality of nodes installed throughout a building each include a wall-mounted unit supported by an in-wall electrical box, a connection inside said in-wall electrical box between the wall-mounted unit and the building's mains-power wiring system, and a power line communications transceiver for communication with the other nodes through the mains-power wiring system. The nodes includes respective speakers, and are operable in a music playing mode in which music data is streamed over the mains-power wiring system to two or more nodes in different rooms of the building for simultaneous audio playback therein. The wall mounted unit includes a panel mounted over the in-wall electrical box and a plurality of light sources positioned to emit light from perimeter edges of the panel to provide a wall illumination effect on the wall surface surrounding the control panel and the electrical box.

4 Claims, 4 Drawing Sheets

(51) Int. Cl.
*H04R 27/00* (2006.01)
*G08B 13/196* (2006.01)
*G08B 13/24* (2006.01)
*H01R 25/00* (2006.01)
*H04N 7/18* (2006.01)
*H01H 49/00* (2006.01)
*H01R 24/30* (2011.01)
*H02J 3/14* (2006.01)
*G08B 13/16* (2006.01)
*H01R 107/00* (2006.01)
*H02G 3/12* (2006.01)

(52) U.S. Cl.
CPC ......... *G08B 13/2491* (2013.01); *H01H 49/00* (2013.01); *H01R 24/30* (2013.01); *H01R 25/006* (2013.01); *H02J 3/14* (2013.01); *H04N 7/188* (2013.01); *H04R 27/00* (2013.01); *G08B 13/19697* (2013.01); *H01H 2221/01* (2013.01); *H01H 2221/014* (2013.01); *H01H 2221/016* (2013.01); *H01H 2300/03* (2013.01); *H01R 2107/00* (2013.01); *H02G 3/121* (2013.01); *H04R 2227/005* (2013.01); *Y02B 70/3225* (2013.01); *Y02B 70/3241* (2013.01); *Y02B 70/3266* (2013.01); *Y02B 90/224* (2013.01); *Y04S 20/14* (2013.01); *Y04S 20/222* (2013.01); *Y04S 20/227* (2013.01); *Y04S 20/242* (2013.01)

(58) Field of Classification Search
CPC ............. H04L 12/2803; H04L 12/2838; H04L 2012/2843
See application file for complete search history.

(56) References Cited

U.S. PATENT DOCUMENTS

| | | | |
|---|---|---|---|
| 6,369,517 B2 | 4/2002 | Song et al. | |
| 6,423,900 B1 | 7/2002 | Soules | |
| 6,798,341 B1 | 9/2004 | Eckel et al. | |
| 6,967,565 B2 | 11/2005 | Lingemann | |
| 7,006,523 B2 | 2/2006 | Binder | |
| 7,035,280 B2 | 4/2006 | Binder | |
| 7,036,948 B1 | 5/2006 | Wyatt | |
| 7,095,756 B2 | 8/2006 | Binder | |
| 7,785,138 B2 | 8/2010 | Bonnassieux et al. | |
| 7,821,160 B1 | 10/2010 | Roosli et al. | |
| 7,973,589 B2 | 7/2011 | Rothenberger | |
| 8,006,105 B1 | 8/2011 | Sivertsen | |
| 8,089,032 B2 | 1/2012 | Beland et al. | |
| 8,456,131 B2 | 6/2013 | Bukow | |
| 9,196,432 B1 | 11/2015 | O'Keefe | |
| 9,389,769 B1 | 7/2016 | O'Keeffe | |
| 2003/0048918 A1 | 3/2003 | Dillon et al. | |
| 2005/0018766 A1 | 1/2005 | Iwamura | |
| 2005/0184867 A1 | 8/2005 | Osann, Jr. | |
| 2005/0267605 A1 | 12/2005 | Lee et al. | |
| 2007/0237337 A1* | 10/2007 | Mah .................... | H04R 5/04 381/77 |
| 2008/0140565 A1 | 6/2008 | DeBenedetti et al. | |
| 2009/0096623 A1 | 4/2009 | Roosli | |
| 2012/0223840 A1 | 9/2012 | Guymon et al. | |
| 2012/0275526 A1 | 11/2012 | Hughes | |
| 2012/0292239 A1 | 11/2012 | Cunningham et al. | |
| 2013/0257315 A1 | 10/2013 | Restrepo et al. | |
| 2014/0098247 A1 | 4/2014 | Rao | |
| 2015/0228167 A1 | 8/2015 | Scalisi | |
| 2015/0339912 A1 | 11/2015 | Farrand | |
| 2016/0155581 A1 | 6/2016 | O'Keeffe | |
| 2016/0216700 A1 | 7/2016 | Fan | |
| 2016/0245538 A1 | 8/2016 | Amer | |
| 2016/0261425 A1 | 9/2016 | Horton | |
| 2016/0274611 A1 | 9/2016 | Amer | |
| 2016/0278187 A1 | 9/2016 | Amer | |
| 2016/0284170 A1 | 9/2016 | Kasmir | |

OTHER PUBLICATIONS

Thiel et al, Automatic CCTV Surveillance—Towards the Virtual Guard, 1999.

Ahmed et al, Cloud Based network management and control for building apparatus for efficient smart home, 2008.

Balasubramanian et al, Improvements in home automation strategies for designing apparatus for ethent smart home, 2008.

* cited by examiner

WALL-MOUNTED SMART SWITCHES AND OUTLETS FOR USE IN BUILDING WIRING FOR LOAD CONTROL, HOME AUTOMATION, AND/OR SECURITY PURPOSES

CROSS REFERENCE TO RELATED APPLICATIONS

This application claims benefit under 35 U.S.C. 119(e) of Provisional Application Ser. No. 62/064,168, filed Oct. 15, 2014, the entirety of which is incorporated herein.

FIELD OF THE INVENTION

The present invention relates generally to wall mounted switches and outlets for controlling electrical loads that rely on mains power distributed thereto through concealed electrical wiring in the walls of a building, and more particularly to smart switches and outlets that are substitutable for conventional mechanical switches and unswitched sockets in retrofit applications to add extra features and functionality, and can also be easily installed using conventional electrical boxes for new installation applications.

BACKGROUND OF THE INVENTION

It is known in the prior art to replace conventional mechanical light switches, e.g. toggle switches, with electronic alternatives in order to provide additional functionality over the control of the light(s) or other load device(s) in the circuit wired to that switch. Examples of such added functionality that can be incorporated with a retrofit electronic switching device include touch-based or proximity-based control over the load circuit, remote control of the load circuit from elsewhere in the same building, and incorporation of the switch devices into home-automation systems with various light settings that can be user-activated or cycled on a programmed scheduled.

Such Home automation systems typically also provide climate control by automatically controlling connected HVAC equipment, and have also been known to incorporate or cooperate with home security systems to provide intrusion detection and alarm activation. Known alarm systems also incorporate video capture functionality in order to record such an intrusion, for example to aid in criminal investigation of the event, and provide remote real-time notification to homeowners of such an event via mobile devices such as mobile phones and computer tablets.

Applicant has developed a unique system that, in one embodiment, incorporates all these functions, and more, and can be easily retrofitted into an existing home to provide wall-mounted controls conveniently located through the premises in a manner avoiding the need for running new wiring and making use of existing electrical boxes to support the wall mounted controls without need for any drywall repair of other customization of the wall space.

Numerous other advantages and unique aspects of the invention will be readily appreciable from the further description and illustration of the invention set out herein.

SUMMARY OF THE INVENTION

According to a first aspect of the invention, there is provided an electrical switch device for installation at an in-wall electrical box for control over one or more electrical loads of a building via electrical wiring of said building, the electrical switch device comprising:

a switch module comprising a housing sized and shaped to fit at least partially within the in-wall electrical box, a plurality of electrically controlled switches carried by the housing, and a respective set of line and neutral contacts carried on the housing for each of said plurality of electrically controlled switches to enable connection of a different respective load circuit across each of said plurality of electrically controlled switches;

a control panel mountable over an open front of the in-wall electrical box and the housing therein and having a user-interface to enable operation of said control panel by a user; and a connection connectable between the control panel and the switch module to enable transmission of signals from the control panel to the switch module, including control signals operable to control the plurality of electrically controlled switches of the switch module;

wherein a size of the control panel is sufficient to fully cover the open front of a multi-gang electrical box, whereby the same switch module and control panel are usable with either a single-gang or multi-gang electrical box without leaving any portion of the open front of the single-gang or multi-gang electrical box uncovered by said control panel.

In one embodiment, the plurality of electrically controlled switches comprises four electrical switches and the control panel is sized to full cover the open front of a four-gang electrical box.

In one embodiment, a front panel of the housing of the switch module has two sets of socket openings therein, each set of socket openings being laid out according to an electrical pin or blade layout of a standard electrical plug and the sets of line and neutral contacts includes a respective pair of line and neutral contacts positioned behind two openings of each of said two sets of socket openings so that insertion of pins or blades of a standard electrical plug into said two openings of either set of socket openings will connect said standard electrical plug to one of the plurality of electrically controlled switches.

In one embodiment, the user interface of the control panel is at least partially defined at a front face of the control panel that faces away from the electrical box when mounted thereover, and comprises a display screen and a pair of touch panels respectively disposed opposite one another across the display screen, each touch panel being operable to control a respective one of the plurality of switches.

Preferably the housing of the switch module is sized and shaped to place a majority of the housing inside the electrical box with a front portion of the housing jutting through the open front of the electrical box, the control panel comprises a recess in a rear face thereof that faces toward the electrical box when mounted thereover, and the recess in the rear face of the control panel is sized and shaped to matingly fit over the front portion of the housing that juts through the open front of the electrical box.

Preferably the connection comprises male and female connectors on opposite ones of the switch module and the control panel in aligned positions at the front portion and recess thereof so as to couple said male and female connectors together under mating receipt of the front portion of the module in the recess of the control panel.

Preferably the housing of the switch module comprises airflow openings thereon at the front portion of the housing and the control panel comprises airflow openings thereon at the recess, and airflow openings in the housing and the control module are placed in fluid communication with one another under mating receipt of the front portion of the module in the recess of the control panel.

Preferably the airflow openings on the housing of the switch module comprises first and second sets of airflow openings that are disposed on opposing sides of the front portion of said housing and fluidly communicate with one another through an interior space of said housing, the airflow openings on the control panel comprise third and fourth sets of airflow openings that are disposed on opposing sides of the recess in said control panel, and the control panel further comprises fifth and sixth sets of airflow openings thereon at opposing perimeter edges of the control panel, the fifth and sixth sets of airflow openings being fluidly communicated with the third and fourth sets of airflow openings through an interior space of the control panel, whereby the airflow openings of the housing and control panel define an airflow cooling path passing fully through both said housing and control panel.

In one embodiment, the control panel comprises a power supply for converting AC mains power to DC power, and the connection between the switch module and the control panel includes a power connection for providing AC power to the control module.

In one embodiment, the control panel comprises light sources operable to emit light from perimeter edges of the control panel to provide a wall illumination effect on a wall surface surrounding the control panel and the electrical box.

In one embodiment, the control panel comprises a microphone operable to capture audible events including voice recognition commands and audible home intrusion events, and wherein the control panel comprises a local processor and local non-transitory computer readable memory coupled thereto on which statements and instructions are stored for execution by the processor in order to process captured audio and identify said voice recognition commands and audible home intrusion events from said captured audio.

In one embodiment, the control panel comprises at least one sensor operable to detect home intrusion events, and wherein the control panel comprises a local processor and local non-transitory computer readable memory coupled thereto on which statements and instructions are stored for execution by the processor in order to process signals from said at least one sensor, and in response to a detected home intrusion event, activate a local camera on said control panel to record video and/or images of a local environment of the control panel, and activate at least one of the electronically controlled switches.

The electrical switch device may be used in combination with a separate room illumination device electrically wired to said one of the electronically controlled switches such that activating said one of the electronically controlled switches activates said room illumination device.

The electrical switch device may be used in combination with an additional electrical switch device, the control panel being arranged to send out an alarm signal for triggering at least one of the electronically controlled switches of said additional electrical switch device.

The electrical switch device may be used with a central controller to which both of said electrical switch devices are connected, each of said electrical switch devices being arranged to send the alarm signal to the central controller, which in turn signals the other of said electrical switch devices to activate at said least one of the electronically controlled switches of said additional electrical switch device.

Preferably said electrical switch devices are arranged to communicate the alarm signals via power line communication through power lines to which the switch modules of both of said electrical switches devices are connected.

According to a second aspect of the invention, there is provided a system comprising a plurality of electrical switch devices of the forgoing type prescribed by the first aspect of the invention, wherein each electrical switch device comprises a power line communications transceiver carried by the housing and connected to power line connection terminals also carried by the housing to enable receipt and transmission of power line communications by each of the plurality of electrical switch devices, and wherein each electronically controlled switch in each electrical switch device has an address or identifier by which incoming power line communications received by the power line communications transceiver of said electrical switch can identify a one of said electronically controlled switches in said electrical switch device to which an incoming command is to be applied in order to have an effect on an electrical load that is coupled to said one of said electronically switches via the line and neutral contacts of said electrical switch device.

According to a third aspect of the invention, there is provided a method of retrofitting an electrical system of a building comprising installing a respective electrical switch device of the forgoing type prescribed by the first aspect of the invention at every one of a plurality of existing in-wall electrical boxes that include electrical boxes of different gang sizes, and in doing so, installing identical switch modules containing a same number of electronically controlled switches in a number of in-wall electrical boxes of different gang sizes.

According to a fourth aspect of the invention, there is provided a security system for a building, the security system comprising:

a plurality of nodes installed at various locations throughout the building;

each node comprising:
  a wall-mounted unit supported by an in-wall electrical box of a mains-power wiring system of the building;
  a connection inside said in-wall electrical box between the wall-mounted unit and said mains-power wiring system of the building;
  a power line communications transceiver by which the node can communicate with the other nodes of the system through said connection to the mains-power wiring system of the building;
  at least sensor operable to detect home intrusion events;
wherein each node is configured to, in response to a detection of a home intrusion event by said node, activate a local alarm-responsive action at said node that detected the home intrusion event, and also send out an alarm signal via said power line communications transceiver for triggering additional alarm-responsive actions at said other nodes.

Preferably at least one of the nodes comprises a local camera on said wall mounted unit to record video and/or images of a local environment in which the wall mounted unit resides, and said one of the nodes is configured to activate the local camera thereof in response to detection of a home intrusion event by said one of the nodes, and also in response to receipt of the alarm signal from any other node.

Preferably the at least one sensor of each node comprises a microphone for detecting audible home intrusion events, and each node is configured to record audio from said microphone in response to detection of a home intrusion event by said node, and also in response to receipt of the alarm signal from any other node.

Preferably at least some of the nodes comprises at least one switch to which a lighting device is connected for powering of said lighting device by the mains-power wiring of the building when said switch is activated, and each of said at least some of the nodes is configured to activate said switch in response to detection of a home intrusion event by said node.

In one embodiment, each of said at least some of the nodes is configured to also activate said switch in response to receipt of the alarm signal from any other node.

Preferably each node comprises a module that is mounted to the electrical box, said module comprising the power line communication transceiver and defining the connection to the mains-power wiring inside the electrical box, and wherein the wall-mounted unit comprises the at least one sensor, is mounted indirectly to the electrical box by the module, and is powered by said module.

According to a fifth aspect of the invention, there is provided a wall mountable security system device comprising:
  at least one bracket fastenable to an in-wall electrical box of a mains-power wiring system of a building to support the device on said in-wall electrical box;
  wire connection terminals for establishing connections to power lines of said mains-power wiring system of the building;
  a power line communications transceiver by which the device can communicate with the other like devices through said power lines;
  at least sensor operable to detect home intrusion events; and
  a local processor and computer local readable memory coupled thereto on which statements and instructions are stored for execution by the processor in order to process signals from said at least one sensor, and in response to a detected home intrusion event, activate a local alarm-responsive action of said device and send out an alarm signal via said power line communications transceiver for triggering additional alarm-responsive actions by said other like devices.

According to a sixth aspect of the invention, there is provided an electronic system for use in a building, the electronic system comprising:
  a plurality of nodes installed at various locations throughout the building;
  each node comprising:
    a wall-mounted unit supported by an in-wall electrical box of a mains-power wiring system of the building;
    a connection inside said in-wall electrical box between the wall-mounted unit and said mains-power wiring system of the building;
    a power line communications transceiver by which the node can communicate with the other nodes of the system through said connection to the mains-power wiring system of the building;
    a microphone operable to capture audible events.

Preferably each node is operable to detect verbal commands from among the audible events captured by the microphone, and to perform a responsive action based on said verbal commands, whereby verbal control over output actions of the system is enabled from each and every room of the building in which one or more of the nodes are installed.

Preferably each node is operable to detect home intrusion events from among the audible events captured by the microphone, and to activate alarm signals in response to said detected home intrusion events.

Preferably each node is configured to transmit alarm signals to said other nodes in response to said home instruction events and thereby trigger alarm responsive events at said other said other nodes.

According to a sixth aspect of the invention, there is provided an electronic system for use in a building, the electronic system comprising:
  a plurality of nodes installed at various locations throughout the building;
  each node comprising:
    a wall-mounted unit supported by an in-wall electrical box of a mains-power wiring system of the building;
    a connection inside said in-wall electrical box between the wall-mounted unit and said mains-power wiring system of the building;
    a power line communications transceiver by which the node can communicate with the other nodes of the system through said connection to the mains-power wiring system of the building; and
    at least one speaker;
  wherein the nodes are operable in a music playing mode in which music data is streamed over the mains-power wiring system to the power line communications transceivers of two or more nodes in different rooms of the building for simultaneous audio playback in said different rooms through the speakers of said two or more nodes.

According to an eighth aspect of the invention, there is provided electrical lighting device for installation at an in-wall electrical box, the electrical lighting device comprising:
  a mounting unit arranged for coupling to the in-wall electrical box;
  a panel mountable over an open front of the in-wall electrical box and the mounting unit coupled thereto; and
  a plurality of light sources carried by the panel and positioned to emit light from perimeter edges of the panel to provide a wall illumination effect on a wall surface surrounding the control panel and the electrical box.

BRIEF DESCRIPTION OF THE DRAWINGS

One embodiment of the invention will now be described in conjunction with the accompanying drawings in which.

DETAILED DESCRIPTION

Figure 1:
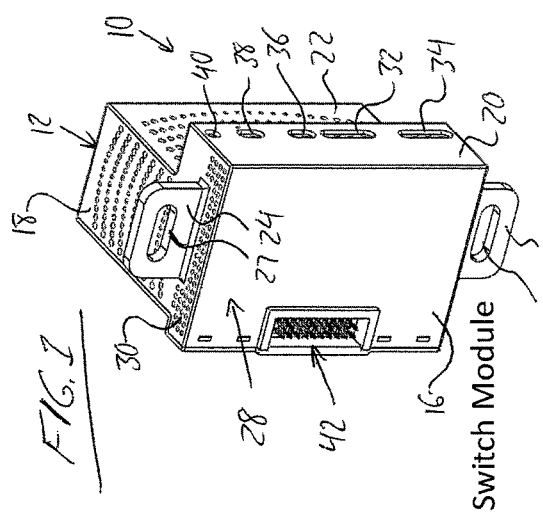
FIG. 1 is a front perspective view of a switch module of the present invention, whose housing is small enough for mounting in a single-gang in-wall electrical box while containing four electronically controlled switches that can replace up to four conventional mechanical switches.

FIG. 1 shows an electronic switch module 10 of the present invention that mounts in a conventional in-wall electrical box, for example in place of a conventional mechanical switch previously mounted therein. A control panel, such as that shown in FIGS. 5 and 6 mates with the electronic switch module in manner both mechanically supporting the control panel thereon and establishing a power and communication link between the panel and the switch module, whereby the control panel enables user control over one or more electrical loads (e.g. lighting fixtures, exhaust fans, or other permanently-wired household fixtures) that are wired to the switch module 10 during installation of the module.

The switch module 10 features an outer housing 12, inside of which there are contained four electronically controlled switches, a power supply for converting AC mains power to DC power for operating the switch module components, a power line communications transceiver, power metering components, a first processor operatively connected to the power line communications transceiver to process incoming signals received at the transceiver and transmit outgoing signals from the transceiver, and a second processor operatively connected to the power metering components to monitor power consumption by any load circuit that is connected to the four electronically control switches.

The illustrated housing features a planar vertical rear panel 14, a wider planar vertical front panel 16 of equal height lying parallel and opposite thereto, and planar horizontal top and bottom panels of equal size and shape interconnecting the front rear housing panels 14, 16. The top and bottom housing panels, of which only the top panel 18 is visible in the drawings, are generally T-shaped due to the wider configuration of the housing 12 at its front end than its opposing rear end, which therefore also gives the overall housing a generally T-shaped structure in plan view. As a result, each side of the housing 12 is divided into two planar vertical side panels, specifically a front side panel 20 connected perpendicularly to the front panel 16 and a rear side panel 22 connected perpendicularly to the rear panel 14. As shown, the top and bottom housing panels are perforated with arrays of holes covering a substantial area of each, as are the rear side panels and the rear panel, in order to form airflow openings by which air can flow through the housing in different directions to cool the electronic components contained therein.

An upper mounting bracket 24 stands perpendicularly upright from the top housing panel 18 at the crossing portion of its T-shape in a vertical plane parallel to that of the front housing panel 16 at a distance set a short distance back therefrom. A matching lower mounting bracket 26 reaches perpendicularly downward from the bottom housing panel at a position matching that of the upper bracket 24. Each bracket 24, 26 has a slot-shaped through-hole 27 of horizontally elongated shape, through which the brackets 24, 26 can be screwed to the pair of upper and lower screw holes situated above and below a mounting space of a conventional electrical box at the open front thereof.

The distance from the plane of the mounting brackets 24, 26 to that of the rear panel 14 is less than the depth of a standard sized single-gang electrical box, and the distance between the two front side panels is likewise less than the width of a standard sized single-gang electrical box. Accordingly, when the brackets 24, 26 are fastened to the screws holes of the electrical box, the substantially majority of the housing 12 spanning rearwardly from the mounting tabs 24, 26 will reside within the interior space of the electrical box. In this mounted position of the switch module 10, a front portion 28 of the housing 12 spanning forwardly from the plane of the mounting tabs 24, 26 juts a short distance out of the electrical box through the open front thereof. The airflow openings in the top and bottom housing panels include an array of airflow openings 30 situated in front of the mounting tabs 24, 26 at this front portion 28 of the housing 12.

The switch module 20 is thus mountable in a single-gang electrical box, but can likewise be mounted at a single gang site of a multi-gang electrical box. As the switch module 20 contains four electronic switches, a single switch module 20 can be mounted in a one-gang, two-gang, three-gang or four-gang in order to take the place of one, two, three or four conventional mechanical switches without any loss of load handling capability or switching functionality. That is, in the event that an existing four-gang box contained four mechanical switches, each controlling a respective load circuit wired to that particular switch, mounting of a single switch module 10 of the present invention at one of the four available gang spaces in the four-gang electrical box allows those same four load circuits to be connected to the switch module for control of these circuits via the four electronic switches inside the module 20. In preferred embodiment, each electronic switch preferably includes a dimming function, whereby dimming functionality of a light fixture is maintained if it was previously wired to a conventional dimming switch. In addition, the installation of the module adds the dimming functionality to a light that was previously wired only to a basic on-off toggle switch. Known dimmable electronic switch circuits using gate-controlled TRIACs or MOSFETS can be employed for the electronic switches of the present invention, which are therefore not detailed further herein.

To enable connection of the load circuits, the front side panel 20 on one side of the housing 12 features a series of exposed connection terminals arranged vertically therealong near the rear edge thereof so as to reside behind the mounting straps 24, 26. This way, the connection terminals and any wires connected thereto remain safely inside the interior space of the electrical box when the switch module is mounted thereto. The connection terminals are grouped into visually distinct clusters or groups, for example each defined by a respective terminal block. One terminal block 32 features four 'load' terminals for connecting a wire from each electronic switch out to a respective load circuit, and another four-terminal block 34 likewise provide four 'return' terminals for connecting the return wire from each load circuit to the respective electronic switch inside the housing. Another terminal block 36 features two terminals for connection of one or two 'neutral' wires, and a second two-terminal block 38 features two terminals for connection of one or two 'line' or 'hot' wires. If the switch module is the only module on a branch circuit of a circuit breaker panel, then only one 'neutral' wire and one 'line' wire are connected. To install another switch module on the same circuit, then the second pair of 'neutral' and 'line' terminals are employed to connect the second module to the circuit breaker panel in parallel with the first switch module. The line and neutral connections provide the input to the switch module's DC power supply that powers the switch module's internal components, and connect across the four parallel electronic switches in order to provide AC power to any load circuit connected to the module. The line and neutral connections also enable transmission and receipt of power line communication signals by the switch module 10. A final single terminal block 40 defines a ground or earth terminal of the switch module.

A female connection port 42 is left open at the otherwise rectangular front panel 16 of the switch module housing 12 so that an array of contact pins in the female connection port can be engaged with the contacts of a mating male connector on the control panel in order to establish a power and communication connection between the switch module and the control panel via mating of these connectors. The electronic components of the control panel are powered from the DC power supply of the switch module through this connection, which also enables signals from the control panel to control the four electronic switches of the switch module 10 through this connection.

Figure 2:
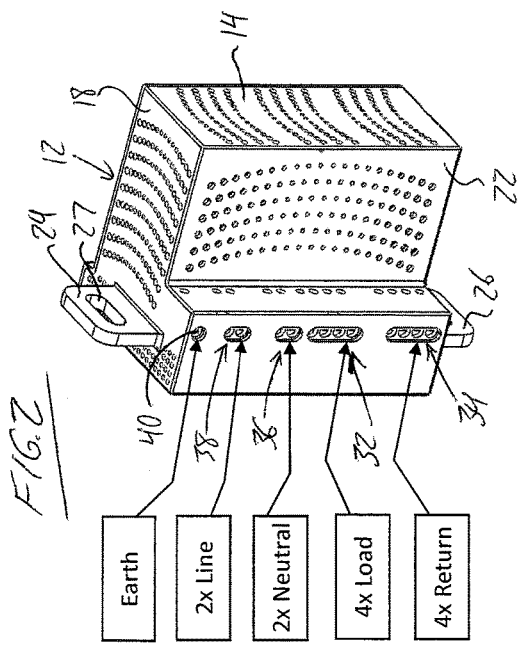
FIG. 2 is a rear/side perspective view of the switch module of FIG. 1, which includes wire connection terminals through which up to four load circuits can be connected, and by which the module is connectable within a power line communications network featuring additional switch modules.
Figure 5:
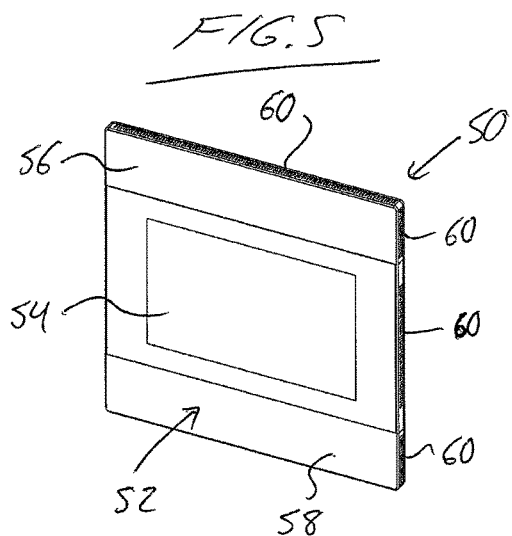
FIG. 5 is a front perspective view of a touch screen control panel that is matable with the switch module of FIG. 1 to support the control panel thereon in a wall-mounted that conceals the drywall opening in which the electrical box is mounted.
Figure 6:
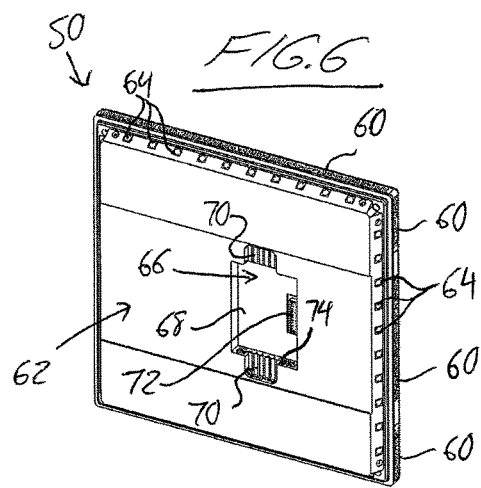
FIG. 6 is perspective view of a rear face of the touch screen control panel of FIG. 5, which features a rectangular recess for matingly fitting over a front end of the switch module that juts out from the electrical box in order to carry the control panel in the wall mounted position and establish a communication and power connection between the switch module and control panel via mating connectors thereon.

FIGS. 5 and 6 show a touch screen control panel 50 for use with the switch module 10 of FIGS. 1 and 2. With particular reference to FIG. 5, a generally rectangular planar front face 52 of the control panel faces away from the switch module and the electrical box in which the switch module is mounted when the control panel 50 is installed. The front face features a centrally positioned touch-screen display 54, an upper touch-pad 56 residing above the touch-screen 54 and spanning the width of the front face 52 along the upper edge thereof, and a matching lower touch-pad 58 residing below the touch-screen 54 and spanning the width of the front face 52 along the upper edge thereof.

Turning to FIG. 6, a generally rectangular planar rear face 62 of the control panel 50 lies parallel to the front face. As shown, the rear face 62 may be slightly smaller in width and height than the front face, with the enclosure or casing of the thickness of the control panel thus being divided into a front portion of slightly greater circumferential or peripheral size than the rear portion. The four perimeter edges of the control panel's front portion feature slot-shaped airflow openings 60 extending therealong The four perimeter edges of the control panel's rear portion, which are set back slightly inward from the perimeter edges of the larger front portion, each feature a series of multi-colour LED units 64 set therein at equally spaced intervals around the periphery of the rear portion of the control panel to provide outwardly radiating light from the rear portion of the control panel enclosure. When the control panel is installed, these LED units 64 provide ambient lighting effects on the wall surface over which the control panel is mounted.

The processor of the control panel may execute pre-programmed, user-programmed or user-customizable wall lighting routines in which the different LED units are activated and deactivated, and/or varied in output lighting colour and/or output light intensity (or brightness) in sequential, random or other patterns to create a dynamic lighting effect, as an alternative to static ambient lighting. One example includes a 'sunrise' lighting effect, in which all LED units are activated in a same colour, and gradually increase in output intensity so that the annular casting of light on the wall around the control panel gradually increases in diameter. This may include variation of the colour (e.g. temperature) as the intensity or brightness is increased. The sunrise lighting effect may be incorporated into a wake-up alarm routine, accompanied by playback of audio signals (e.g. music) through the local speakers of the control panel (as discussed in more detail below) in a manner gradually increasing the volume of the audio as the light intensity is likewise increased over time. Another lighting effect is a 'northern lights' effect with a colour variation display in which in which all the LEDs are illuminated in an initial first colour, and then moving sequentially around the control panel in one or both directions, are changed to another output colour, whereby a ring of colour lighting washed onto the wall around the control panel gradually changes from one colour to another as an arc of one colour gradually grows in circumferential span around the control panel, while the arc of the previous colour gradually reduces in circumferential span around the control panel.

A recessed area 66 in the otherwise planar rear face 62 of the control panel 50 features a main rectangular area 68 whose dimensions are generally equal or slightly greater than the rectangular dimensions of the front panel 16 of the switch module. As a result, the recessed area 66 of the control panel's rear face 62 can be matingly fitted over the front portion 28 of the switch module 10 that juts forwardly out of the open front of the electrical box at the finished interior surface of the drywall or other finishing material of the wall in which the electrical box resides.

The front portion of the switch module 10 thus reaches into the room from the drywall in order to form a mounting feature on which the control panel can be hung. Suitable mechanical interlock means are preferably defined between the recess of the control panel and mating front portion of the switch to provide secure, confident retention of the control panel on the switch module when the male front end of the switch module is fitted into the female recess at the rear of the control panel. Smaller recesses 70 of lesser width and depth than the main rectangular area 68 of the recess extend upward and downward therefrom, and are sized to fit over the mounting tabs 24, 26 of the switch module 10 when the control panel 50 is mounted thereon. As a result, the rear face 62 of the control panel 50 fits flush against the drywall or other finished surface of the wall around the electrical box in order to fully conceal the electrical box and the switch module behind the control panel.

A male connector 72 is situated in the main rectangular recess 68 at a position therein that self-aligns and mates with the female port 42 at the front panel 16 of the switch module 10 when the recess 66 is fitted over the protruding front portion 28 of the switch module 10. This way, the power and communication connection between the switch module and the control panel is automatically established by placement of the control panel onto the switch module without need for separate connection of a cable during the installation process. Although described as being generally T-shaped due to its wider front end than rear end, the front panel 16 of the switch module 10 is not symmetrical in terms of its lateral reach, instead jutting further to one side of the housing than the other. In the instance of the illustrated embodiment, the front portion of the housing reaches further outward at the terminal-equipped side of the housing 12. The mounting brackets 24, 26 are not centered across the width of the front panel 16 of the switch module housing, and the mounting bracket recesses 70 of the control panel are likewise offset from the center of the main rectangular recess 68. This way, the control panel can only fit onto the switch module 10 in a proper right-side-up orientation, thereby ensuring the alignment and connection between the communication and power connection features 42, 72 by preventing sliding of the touchscreen onto the switch module in the improper orientation.

The peripheral size of the control panel 50, even at the smaller rear half thereof, exceeds that of a standard four-gang electrical box, whereby the surface area of the control panel 50 will completely cover the open front of any conventional one-gang, two-gang, three-gang or four-gang electrical box. To such end, the control preferably measures a minimum of 8-centimeters high by 19-centimeters wide. Accordingly, with the switch module 10 mounted in any existing electrical box, no separate cover-panel or finishing-panel is required to provide a clean, finished appearance, as the opening in the drywall around the existing electrical box is fully concealed behind the control panel 50. Due to the overhanging position of the switch module, in which its front portion juts out past the drywall or other finished surface of the wall, the control panel is flush mounted against the wall without requiring any intermediate bracket or support between the box-mounted switch module 10 and the control panel 50. Also, no enlargement of the existing drywall opening is required to accommodate this flush-mount condition of the control panel. Retrofit installation at an existing switch site is thus greatly simplified, requiring only deactivation of the respective circuit breaker at the panel, removal of the existing switch's cover plate, removal of the existing switch and disconnection thereof from the existing building wiring, connection of the building wiring to the switch module 10, fastening of the switch module to the electrical box, and simple male/female mating of the control panel to the switch module. The process is the same, regardless of the number of switches being replaced in the electrical box, as only one switch module unit needs to be installed, even if two, three or four mechanical switches are being replaced in the same gang box.

Figure 9:
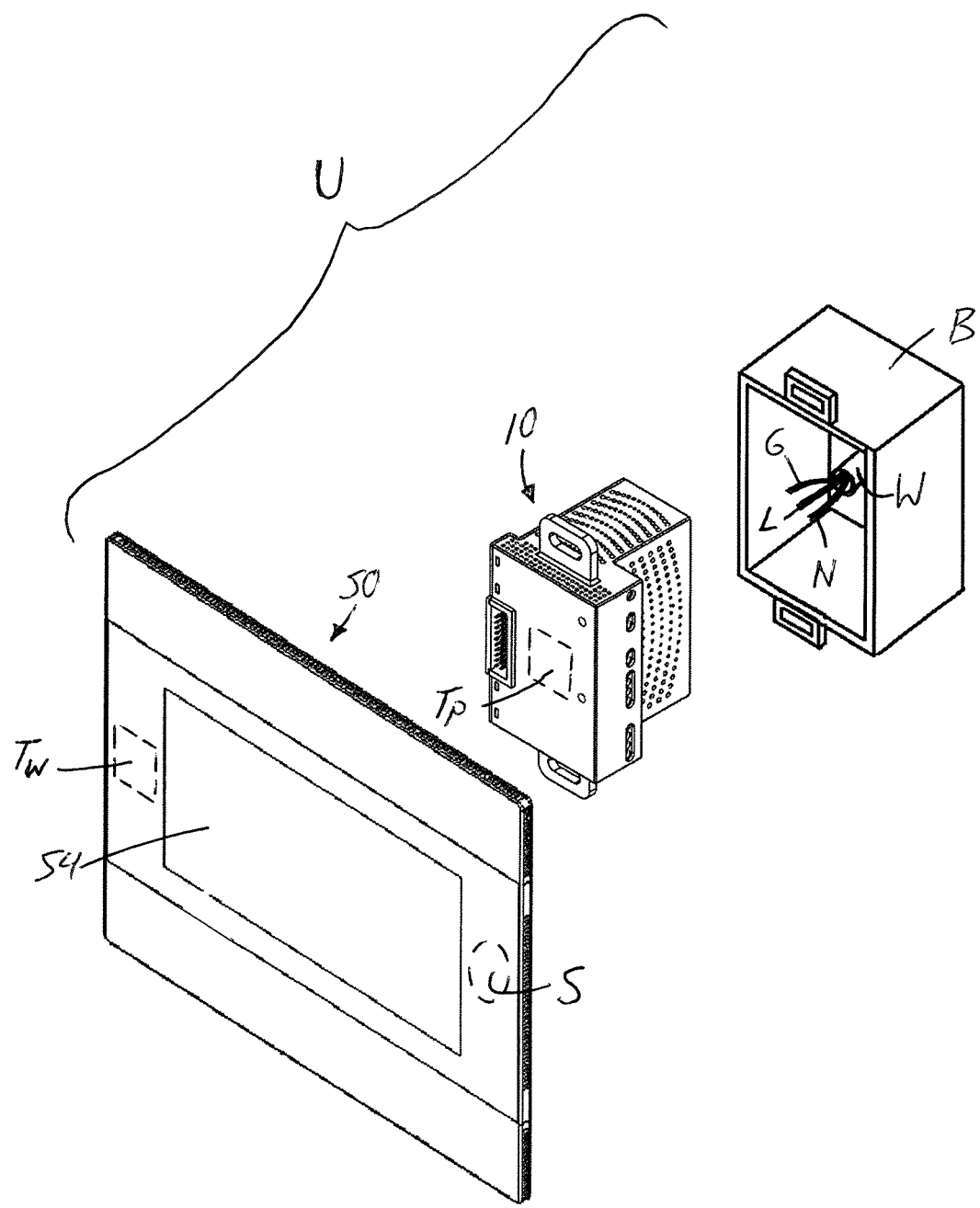
FIG. 9 illustrates assembly of the switch module of FIG. 1 and touch screen control panel of FIG. 5 with an electrical box to form a wall mounted unit.

FIG. 9 illustrates the above described assembly of the switch module 10 and control panel 50 on an electrical box B to form a finished wall-mounted unit U. As described above, the switch module 10 is fastened through its mounting brackets 24, 26 to the electrical box B and the line, neutral and ground wires L, N, G of the building wiring W are connected to the appropriate terminals of the switch module 10 inside the box B, thereby mounting the switch module 10 to the wall and establishing connection between the building wiring W and the power line communications transceiver $T_P$ inside the switch module 10. The control panel 50 is then fitted over the front portion of the switch module 10, thus supporting its various components, including its schematically illustrated wireless transceiver $T_W$ and speaker S, on the wall.

The airflow slots 60 in the perimeter edges of the control panel 50 are in fluid communication with one another through the interior space of the control panel's enclosure to enable airflow therethrough. Likewise, the array of airflow holes 30 in the top panel 18 of the switch module housing 12 are in fluid communication with those of the opposing bottom panel of the switch module housing 12. In addition, an array of airflow holes 74 is provided in each of the top wall and bottom wall 68$a$ of the main rectangular recess 68 at the rear of the control panel 50. The airflow holes 74 in the bottom wall of the recess 68 are in fluid communication with at least the airflow slots of the bottom perimeter edge of the control panel enclosure, and the airflow holes (not shown) in the top wall of the recess 68 are in fluid communication with at least the airflow slots of the top perimeter edge of the control panel enclosure 50. As a result, the airflow openings in the control panel and the switch module provide a through-flow air passage passing fully through both the control panel and the switch module when assembled. This helps cool the electronic components of the switch module that is otherwise substantially enclosed by the electrical box and overlying control panel. A fan may be incorporated into one or both components as a forced air cooling means to encourage airflow through the assembled units via this flow-through air passage.

Figure 4:
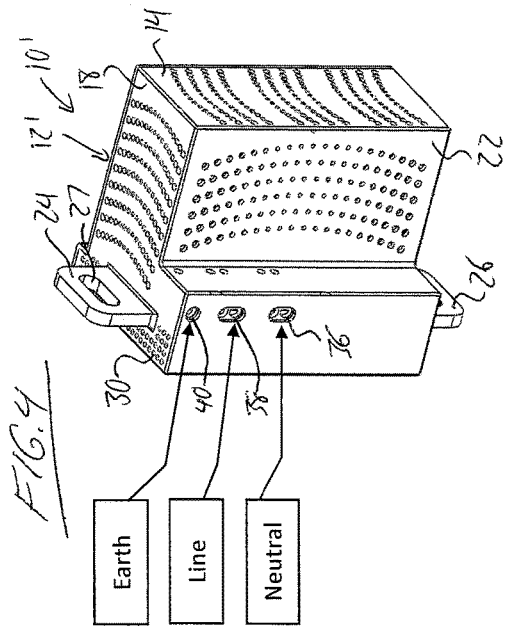
FIG. 4 is a rear/side perspective view of the socket module of FIG. 2, which features the same power line communication terminals as the switch module of FIGS. 1 and 2.
Figure 3:
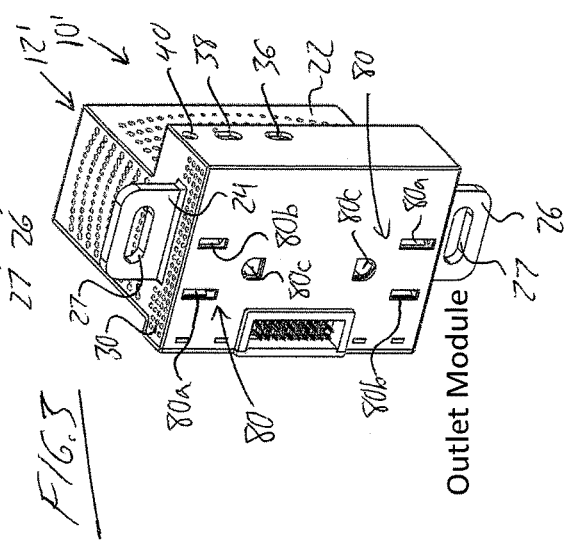
FIG. 3 is a front perspective view of a switchable socket module of the present invention, which features two sockets by which the plugs of two conventional power cords can be connected to two electronically controlled switches inside the module.

FIGS. 3 and 4 show a switchable outlet or socket module 10' of same size and shape as the switch module 10 of FIGS. 1 and 2 for mounting to a single-gang electrical box in the same manner as the switch module, but as a replacement for a conventional electrical outlet instead of as a replacement for a conventional mechanical switch. The housing 12' of the outlet or socket module 10' is of the substantially the same configuration, except that a reduced number of connection terminals are included, and the front panel 16 of the housing features two sets of socket openings 80 therein.

Inside the housing, the outlet or socket module 10' differs from the switch module 10 in that it features only two electrically controlled switches (e.g. gate-controlled TRI-ACs) and associated power metering components. Instead of having load and return terminal blocks 32, 34 for use in connecting permanently wired fixtures to the electronic switches, each electronic switch instead has a respective pair of neutral and hot contacts respectively disposed behind the two blade-shaped openings 80$a$, 80$b$ of one of the two sets of socket openings 80. This way, plugging the two blades of a conventional electrical plug into the blade shaped openings 80$a$, 80$b$ of the socket module 50' will electrically connect the plug-equipped device or appliance to the respective electronic switch of the socket module. Each set of socket openings 80 is completed by a ground pin opening 80$c$ for receiving the ground pin of a conventional three-pin grounded plug. Although the illustrated embodiment features blade shaped socket openings for the flat, blade-like shape of standard North American 120V plugs, it will be appreciate that other standard plug/socket layouts and shapes may be employed, for example according to national or regional standards used in other jurisdictions.

Figure 7:
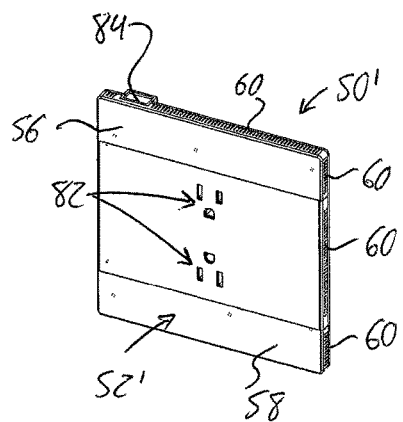
FIG. 7 is a front perspective view of a socket control panel that is matable with the switchable socket module of FIG. 3 to support the control panel in a wall-mounted position concealing the drywall opening in which the electrical box is mounted.
Figure 8:
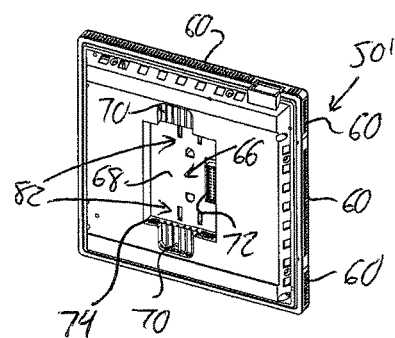
FIG. 8 is a rear perspective view of the socket control panel of FIG. 7, which features the same recess and connector as the touch screen control panel of FIG. 6 for similar mounting of the socket control panel on the socket module of FIG. 3.

FIGS. 6 and 7 show a socket control panel 50' sharing many features of the touch screen control panel 50 of FIGS.

5 and 6. Unlike the user interface of the touch-screen panel 50, which features both a touch-screen and two touch pads, the user interface of the socket control panel 50' has only the two touch pads 56, 58 and no touch screen. The central area of the front face 52' of the socket control panel 50' instead features two sets of socket openings 82 therein, which pass through into the main rectangular recess 68 in the rear face 62 of the socket control panel 50'. The socket control panel 50' and the socket module 10' fit together in the same manner as the touch-screen control panel 50 and switch module 10, and cooperate in a similar manner to provide control over the switchable on/off state of the electronic switches inside the module housing 12'. The socket openings 82 in the socket control panel align with the socket openings 80 in the socket module to allow the blades or pins of an electrical plug to reach through the aligned openings into engagement with the contacts in the socket module.

As the socket module 10' is intended only as a replacement for a conventional electrical outlet mounted in a single-gang electrical box, the socket control panel 50' may be of a smaller footprint than the touch-screen control panel 50 that is compatible with multi-gang electrical boxes. Accordingly, the size of the socket control panel may be smaller, so long as it is sufficient to fully and confidently conceal a single-gang electrical box, the drywall opening cut therearound, and the socket module 10' mounted to the electrical box.

In addition to the electronic switches, touch panels, touch screen and wall effect surround LEDs, additional built in components of the touch screen control panel 50 of the preferred embodiment also include a camera that faces outward from the panel to capture video and/or still images of the environment in which the panel is installed, a microphone for detecting and recording audible events, at least one speaker (and preferably a pair of stereo speakers) for outputting audio, a wireless transceiver (e.g. WiFi or Bluetooth), and sensors for detecting environmental conditions such as temperature, humidity, light, movement/proximity, carbon monoxide levels. Aside from its lack of a touch screen, the socket control panel 50' may be comparably equipped to the touch-screen panel. In one embodiment, the socket control panel 50' lacks the camera device and associated video/image capture functionality of the touch screen control panel. The illustrated embodiments of the socket control panel 50' features a charging port 84 in the top peripheral edge of the panel, preferably in the form of a Universal Serial Bus (USB) port in order to define a relatively universal charger than can be used on any of a variety of consumer electronics (e.g. mobile phones, music players, etc.) whose batteries can be charged through the USB port of a desktop or laptop computer. The charging port 84 is powered from the AC/DC power supply in the socket module 10', and provides a continuously available charging source regardless of the particular switched state of the electronically-switched AC sockets 80 of the socket module.

Software of the control panel features statements and instructions stored locally on a local non-transitory computer readable medium within the control panel enclosure for execution by one of the processors of the touch screen panel. The software is operable to present an on-screen touch-operated user interface forming part of a larger overall user interface that includes the upper and lower touch pads 56, 58. The user interface is and is operable to control each electronic switch of the switch module on which the touch-screen is mounted.

The on-screen display may present a visual representation of a mechanical on/off toggle or rocker switch, or sliding or rotary dimming switch, for each and every electronic switch of the switch module. Alternatively, such an on-screen representation may be display only for a select one or more of the electronic switches of the switch module, for example those to which an electrical load has been coupled. In one embodiment, each switch representation or 'virtual switch' may comprise a bound rectangular area in the foreground of the display that is visually distinct from an underlying background colour of the on-screen display. A fill-colour of the rectangular area changes between one colour (e.g. red or orange) that represents an 'on' state of the respective electronic switch, and a different colour (e.g. black or grey) that represents an 'off' state of the respective electronic switch. Touching the respective rectangular area of the screen switches the state of the electronic switch between the 'on' and 'off' state. An on-screen dimmer representation may likewise feature a bound rectangular area, with graduations marked along one or both vertical sides thereof. In such instance, sliding one's fingertip up or down the rectangular area adjusts a dimming level of the electronic switch. The colour, hue or intensity of the bound rectangular area of the dimmer representation may change with the dimming level as the user's operates the touch-based adjustment. The programming mode preferably enables user-specified names to be assigned to each electronic switch, for example according to the particular load(s) connected thereto, e.g. "kitchen light", "bathroom light", etc. On the display screen of the touch-screen control panel, the name of the electronic switch or load can then be displayed at any one or more of the virtual switches assigned to that load.

Each touch pad 56, 58 may be operable to control a respective electronic switch of the switch module, for each with a simple 'single touch' gesture switching between the 'on' and 'off' state, and a sliding or wiping gesture in opposing directions along the length direction of the strip being operable to control to increase and decrease the level of the dimming function. In a user-customization or programming mode, the user-interface may allow the user to specify which one of the electronic switches of the switch module is assigned to each of the two touch pads 56, 58.

With power-line communication available between different switch modules, the user-customization or programming mode of the touch screen interface may allow the user to assign the output of an on-screen virtual switch at the control panel of one switch module, to an electronic switch of one of the other switch modules. Accordingly, addressable electronic switches are used to allow such remote control of one switch module from the control panel of another module. Likewise, the two electronic switches of the socket module 10' may be controlled remotely from the touch-screen module 54. In one embodiment, a system of the present invention may employ only a single touch-screen control panel 50, and instead employ a simplified control panel lacking the touch-screen 54 at each other switch module. This simplified panel may therefore be more comparable in structure and operation to the socket control panel 50', but without the socket openings 82. In other embodiments, more than one touch-screen control panel may be deployed throughout the system.

In embodiments that feature use of the simplified control panel on one or more of the switch modules, the simplified panel may have the a smaller footprint and reduced switch control capability like those of the socket module, therefore having only two touch pad switches for load control actions. The simplified control panel may be sized so as to fully cover a one-gang or two-gang electrical box, for example having a minimum width of 10 centimeters and minimum height of 8 centimeters, but not large enough to cover three or four gang boxes that can be covered with the larger touchscreen panel. In one embodiment, the simplified switch panel lacks an on-board camera, therefor making it suitable for use in rooms where the owner does not want cameras present for privacy reasons (washrooms, bedrooms, etc.). Many homes tend to use larger three or four gang electrical boxes only in larger open areas where multiple, separately switchable lighting fixtures are present. Single-gang switches are typically used in smaller areas such as bedrooms, where often only a single lighting circuit is employed. Two-gang boxes are commonly employed in bathrooms to allow separate switching of a single lighting circuit and a separate dedicated circuit for a bathroom exhaust fan. The smaller simplified switch panel is therefore suitable for use in such smaller areas of a building, thereby avoiding camera privacy concerns, reducing expense by not including a touch-screen at every single control point or node in the system, and accommodating for situations where there is insufficient wall space to accommodate the larger touchscreen control panel (e.g. at a single or double gang electrical box mounted closely adjacent to wall-mounted doorway casing).

A central control unit (not shown) may be connected to the switch and socket modules of the system, thereby forming a star network in which communications between the switch and socket modules occur via the central control unit. In one embodiment, a security mode of the system can be initiated by a user, during which the microphone and/or proximity/movement sensor of each control panel monitor for signs of a break-in or other security intrusion. Unlike conventional alarm systems in which the sensors are typically stand-alone units with no local signal processing, the local software and processor(s) of the control panel can perform local signal processing to try and rule out false alarms and better distinguish actual alarm-worthy events from among other recorded audio signals.

Upon confirming an intrusion or other alarm-worthy event, the control panel activates its built-in camera and may also begin storing incoming audio signals from the microphone in order to create a visual and audible recording of the alarm-worthy event, for example to aid potential identification of the intruder during in any subsequent investigation by a homeowner, security personnel, or law enforcement agency. The control panel may also activate all of the electronic switches of the connected switch module in order to turn on any and all lights connected thereto, and emit an audible alarm from its speaker(s). The audible alarm may include a siren, and/or other sounds intended to deter would-be burglars or other unauthorized parties from entering the premises, for example playback of a recorded or simulated dog barking audio. Upon local detection of an alarm-worthy event by one control panel, and outgoing alarm confirmation signal is sent from that control panel, via the respective switch module connected thereto, through the power line carrier network in order to activate the lights, alarm and recording functions at all of the other control panels in the network, for example via the central control unit. The central control unit may be connected to a larger network, e.g. the internet, and configured to send an alarm notification alert to a mobile device (e.g. mobile phone, tablet computer, etc.) via SMS message, email, automated phone call, etc.

The system may be used to stream music or other audio to one or more of the control panels for playing through the on-board stereo speakers thereof. Music streaming can be from local or Internet sources. Audio files can be stored on a separate device (e.g. personal audio device, smartphone, external hard drive etc.) which has access to the local system network, for example by way of wireless (e.g. wifi or Bluetooth) communication with one of the control panels, or wired or wireless connection with the central controller. Files are played by streaming these files locally over the power-line Ethernet, or wirelessly (e.g. via Bluetooth or WiFi) to the control panels. Alternatively, music can be streamed over the Internet from a third party service. Music playback can be synchronized across multiple control panels by having a single control panel acts as a central point which distributes and synchronizes playback one, some or all other control panels, thereby enabling simultaneous broadcast of the audio in multiple rooms each having one or more switch or socket modules, and associated control panels, therein. The speakers also enable the system to make audible announcements, for example in response to voice-command requests by a user that are detected by the microphone of a control panel and recognized by voice-recognition software running on the control panel. Such voice-recognition functionality of the control panels also enables voice-control over the electronic switches and other functions of the switch modules.

Figure 10:
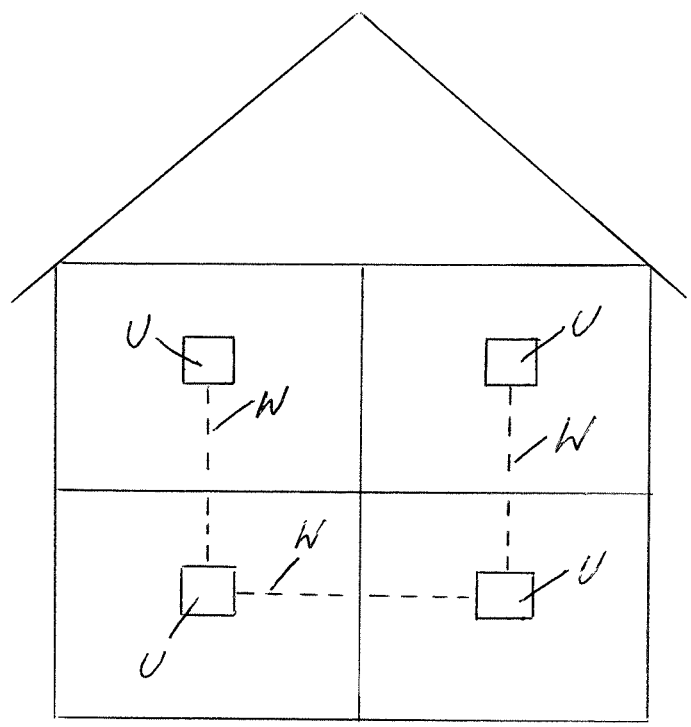
FIG. 10 illustrates installation of multiple in-wall units throughout a building to enable multi-room music playback through the power line communications network.

FIG. 10 schematically illustrates installation of a plurality of wall-mounted units U in different respective rooms of a building, such that the building's wiring W forms a power-line communications network by which the above described streaming of music to multiple rooms can be achieved.

The power line communication between the switch and socket modules of the system not only enables remote-control of an electronic switch from a location other than the particular switch module in which that electronic is found, but also enables room-wide or building-wide pre-sets to be programmed and easily recalled. To elaborate, the system may store one or more 'local pre-sets', i.e. a pre-set that determines the status of one or more loads connected to a single switch or socket module, and 'wide' or 'global' pre-sets, i.e. a pre-set that determines the status of loads connected to a plurality of different switch and/or socket modules at different locations throughout a building. In one embodiment, the touch-screen display of a touch-screen control panel is readily changeable between a 'switching' mode showing a bank of manipulatable virtual switches, a 'local pre-set' mode showing a bank of selectable local pre-sets, and a 'global pre-set mode' showing a bank of selectable global pre-sets. In the embodiment in which the bank of virtual switches are shown as respective elongated rectangular blocks, local pre-sets and global pre-sets may be displayed as bordered areas whose shapes are distinct from one another and from the visual switches, e.g. square areas for local pre-sets and circular areas for global pre-sets. Selecting a pre-set by touch may changes the fill-colour or brightness of the selected pre-set in order to visually confirm the selection, just like the toggling of the virtual switches between 'on' and 'off' states that is confirmed by a visual change in the fill-colour or brightness of the rectangular virtual switch.

Pre-sets may include additional settings beyond mere lighting or load control functions that switch the electronic switches between into predetermined on, off states or dimmed states. For example, a global 'away' pre-set for activation when leaving the premises may activate the alarmed security mode of the system, while also turning off all the lights, setting a predetermined selection of lights into the 'on' state to simulate the presence of one or more people at the unoccupied building, or executing a sequence of scheduled lighting controls (i.e. periodically switching one or more select lights off, and then switching one or more other lights on) that are intended to more realistically simulate a personal presence in the building rather than merely setting a static continually-on condition of one or more lights. Such a scheduled sequence may be programmed, or 'learned' by the system by monitoring the on and off states among the electronic switches of the system at times outside of the 'away' mode of operation. Pre-sets may also incorporate other functions described herein, for example streaming of music to all or a user-selected subset of the total number of control panels in the overall system, and/or controlling the wall illumination function of one or more control panels. Pre-sets may include 'entertainment' pre-sets incorporating both lighting effects and music playback.

The use of a central control unit also enables connection of additional equipment or auxiliary systems that can then be controlled via the control panels of the present invention without need to provide additional wiring beyond the existing building wiring that is used to connect the switch and socket modules. For example, a furnace, air conditioner, humidifier, dehumidifier, and/or other HVAC or climate control equipment, can be connected to the central module, whereby the temperature sensors at the control panels can be used to implement a programmable thermostat and/or zone-based climate control functionality of the system, with optional humidity control via an included humidity sensor, thereby providing a more complete whole-home automation system.

Other functional aspects that can be incorporated into the system include calendar and event tracking functionality in which events can be entered through the touch-screen user interface and/or voice-recognition functionality, and intercom functionality using the microphones of the control panels (and optionally the cameras thereof if at least one of the control panels being used for an intercom communication has a touch-screen or other visual display).

While the forgoing embodiments incorporate the power line communication transceiver and associated first processor, the power metering components and the associated second processor, and a DC power supply for these processors incorporated within the switch module, these components may alternatively be incorporated into the panel, in which case the male connector and female port on the panel and switch module for power and data connection therebetween are adapted to provide AC power to the panel.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. An electronic system for use in a building, the electronic system comprising:
    a plurality of nodes installed in different respective rooms of the building;
    each node comprising:
        a wall-mounted unit supported by an in-wall electrical box of a mains-power wiring system of the building;
        a connection inside said in-wall electrical box between the wall-mounted unit and said mains-power wiring system of the building;
        a power line communications transceiver by which the node can communicate with the other nodes of the system through said connection to the mains-power wiring system of the building;
        at least one speaker; and
        a wireless transceiver operable to wirelessly receive incoming music data from a separate device;
    wherein each node is operable in a music streaming mode in which the incoming music data received by the wireless transceiver of said node from the separate device is distributed from said node to the power line communications transceiver of one or more other nodes via the mains-power wiring system of the building for simultaneous audio playback in a plurality of said different respective rooms through the speakers of said nodes.

2. The system of claim 1 wherein said wireless transceiver of each node is a Bluetooth transceiver.

3. The system of claim 1 in combination with said separate device, wherein said separate device is a smartphone.

4. The system of claim 1 in combination with said separate device, wherein said separate device is a personal audio device.

* * * * *